(12) United States Patent
Early et al.

(10) Patent No.: US 8,950,338 B2
(45) Date of Patent: Feb. 10, 2015

(54) PIPELINE TOOL

(75) Inventors: Ciaran Early, Dublin (IE); Gary Murray, Dublin (IE); Raymond Honour, Kent (GB)

(73) Assignee: The Safer Plug Company Limited, Grand Cayman (KY)

( * ) Notice: Subject to any disclaimer, the term of this patent is extended or adjusted under 35 U.S.C. 154(b) by 0 days.

(21) Appl. No.: 14/007,662

(22) PCT Filed: Mar. 31, 2011

(86) PCT No.: PCT/EP2011/055046
§ 371 (c)(1),
(2), (4) Date: Sep. 26, 2013

(87) PCT Pub. No.: WO2012/130318
PCT Pub. Date: Oct. 4, 2012

(65) Prior Publication Data
US 2014/0020593 A1    Jan. 23, 2014

(51) Int. Cl.
*B61B 13/10* (2006.01)
*F16L 55/32* (2006.01)
*F16L 55/34* (2006.01)

(52) U.S. Cl.
CPC *F16L 55/32* (2013.01); *F16L 55/34* (2013.01)
USPC ..................... 104/138.2; 104/138.1

(58) Field of Classification Search
USPC ....................................... 104/138.2
See application file for complete search history.

(56) References Cited

U.S. PATENT DOCUMENTS

| | | | | |
|---|---|---|---|---|
| 4,862,808 A | * | 9/1989 | Hedgcoxe et al. | 104/138.2 |
| 5,018,451 A | * | 5/1991 | Hapstack | 104/138.2 |
| 5,080,020 A | * | 1/1992 | Negishi | 104/138.2 |
| 5,375,530 A | * | 12/1994 | Zollinger et al. | 104/138.2 |
| 5,685,668 A | | 11/1997 | Justice | |
| 5,878,783 A | * | 3/1999 | Smart | 138/93 |
| 5,971,404 A | * | 10/1999 | Stoves | 280/6.154 |
| 6,107,795 A | * | 8/2000 | Smart | 324/220 |
| 6,123,027 A | * | 9/2000 | Suyama et al. | 104/138.2 |

(Continued)

FOREIGN PATENT DOCUMENTS

| | | |
|---|---|---|
| EP | 0367633 A2 | 5/1990 |
| WO | 03/067134 | 8/2003 |

(Continued)

OTHER PUBLICATIONS

International Search Report dated Dec. 9, 2011.

*Primary Examiner* — Jason C Smith
(74) *Attorney, Agent, or Firm* — Hoffmann & Baron, LLP

(57) ABSTRACT

A self propelled autonomous pipeline tool for use in straight pipe comprising a first part and a second part, a hydraulic system comprising at least one hydraulic piston and means for operating the piston, and a control unit. The hydraulic system is operable to returnably separate the first and second part of the device from each other. The hydraulic system further comprises a plurality of pipeline engaging means positioned along an exterior surface of the device which are operable by the hydraulic system to be engagable with the interior surface of the pipeline. The control unit is in communication with the hydraulic system to control the movement of the pipeline engaging means and the first and second parts such that the pipeline tool is moveable within a straight pipeline. The pipeline tool further comprises a communications module which enables the pipeline tool to utilize ELF communications.

32 Claims, 13 Drawing Sheets

(56) References Cited

U.S. PATENT DOCUMENTS

Figure 1A:
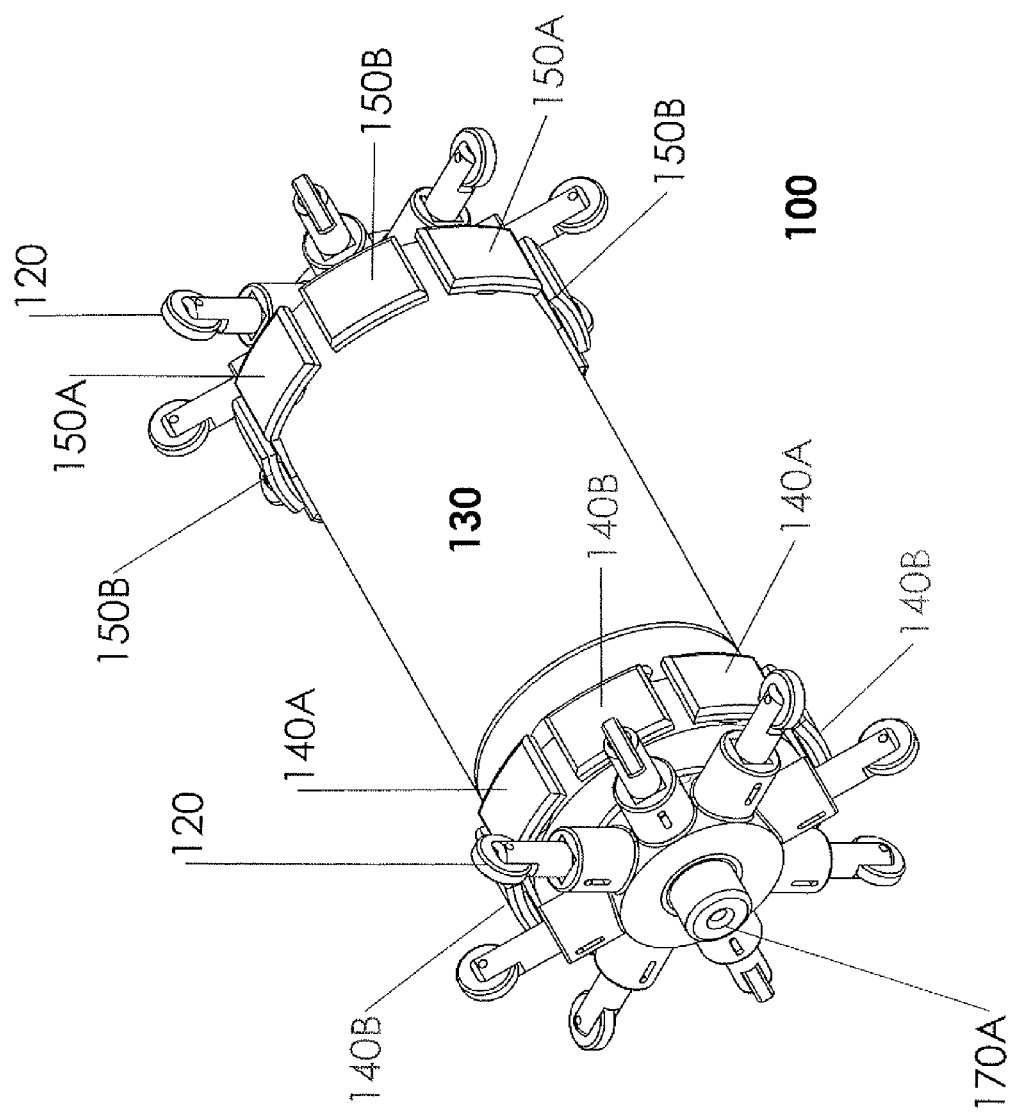

| | | | |
|---|---|---|---|
| 6,339,993 B1* | 1/2002 | Comello et al. | 104/138.2 |
| 6,450,104 B1* | 9/2002 | Grant et al. | 104/138.2 |
| 6,775,872 B1* | 8/2004 | Appleton et al. | 15/104.16 |
| 6,917,176 B2* | 7/2005 | Schempf et al. | 318/568.11 |
| 7,543,536 B2* | 6/2009 | Sergoyan et al. | 104/138.1 |
| 7,597,048 B2* | 10/2009 | Nicholson | 104/138.2 |
| 8,402,911 B1* | 3/2013 | Weisenberg | 118/306 |
| 2004/0045474 A1* | 3/2004 | Simpson | 104/138.2 |
| 2004/0173116 A1* | 9/2004 | Ghorbel et al. | 104/138.2 |
| 2005/0241710 A1 | 11/2005 | Early et al. | |
| 2007/0151475 A1* | 7/2007 | Nicholson | 104/138.2 |
| 2007/0181341 A1 | 8/2007 | Segura et al. | |
| 2012/0090498 A1* | 4/2012 | Redpath et al. | 104/138.2 |
| 2014/0020593 A1* | 1/2014 | Early et al. | 105/26.05 |
| 2014/0020594 A1* | 1/2014 | Early et al. | 105/26.05 |

FOREIGN PATENT DOCUMENTS

| | | |
|---|---|---|
| WO | 2005/028942 | 3/2005 |
| WO | 2005/061944 | 7/2005 |

* cited by examiner

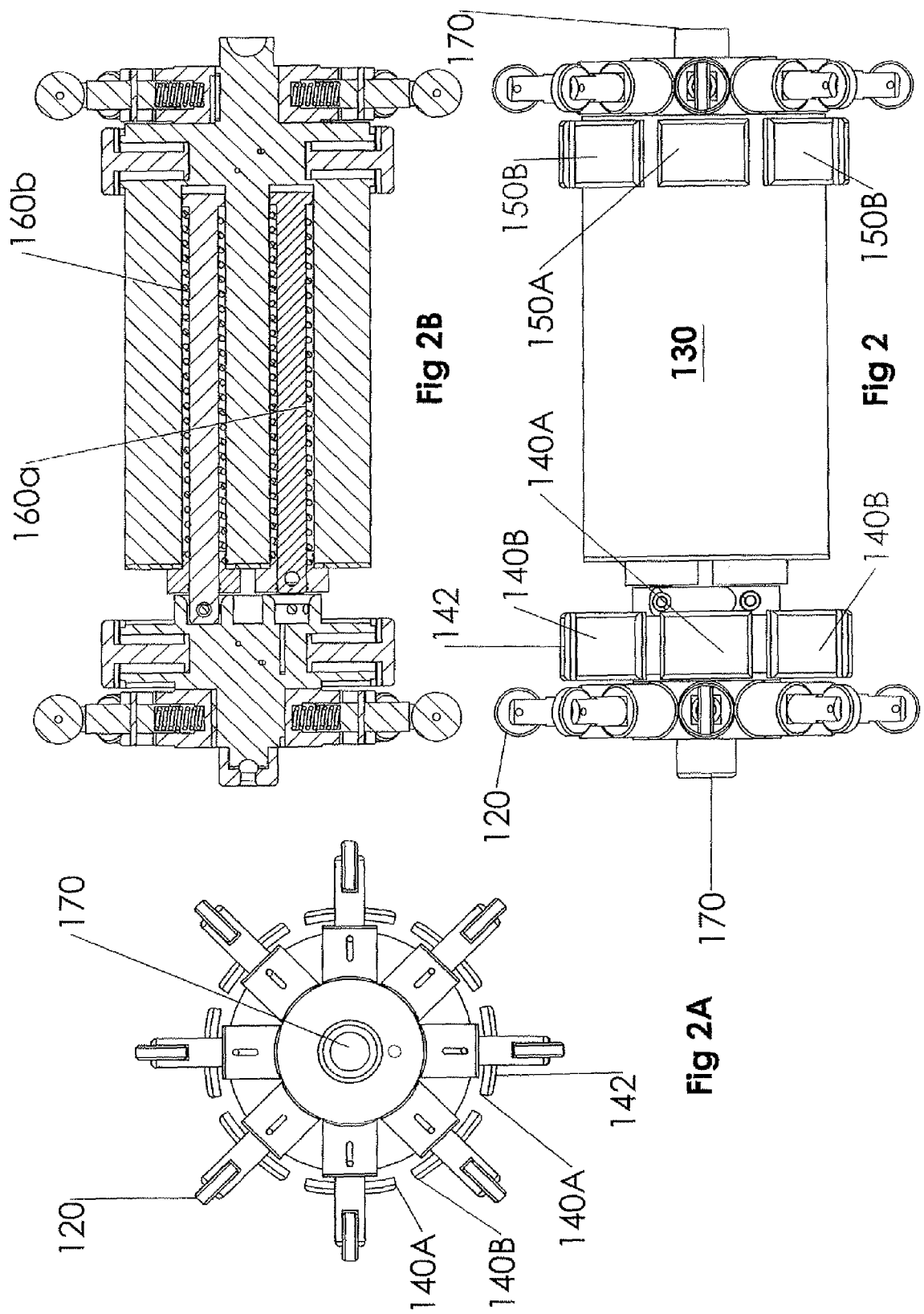

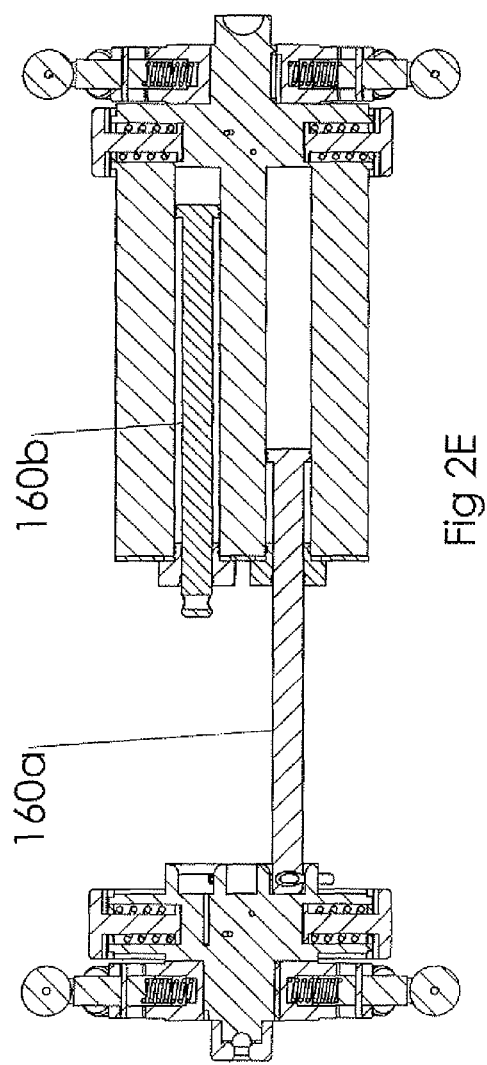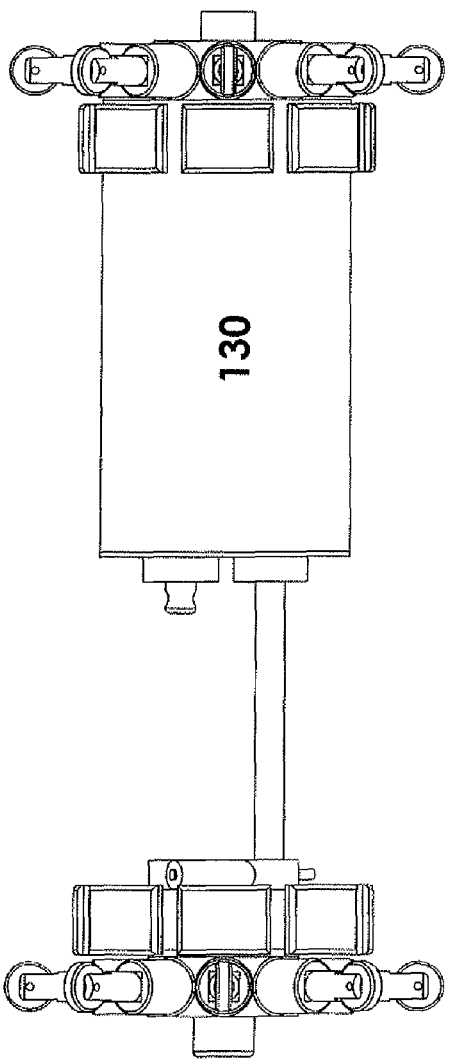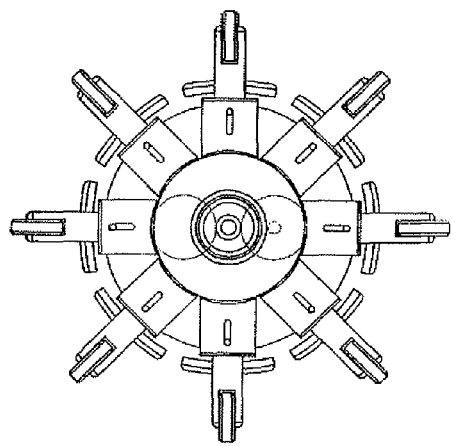

PIPELINE TOOL

This application is the U.S. National Phase of, and Applicants claim priority from, International Patent Application Number PCT/EP2011/055046 filed 31 Mar. 2011, which is incorporated herein by reference.

The present invention relates to a pipeline tool in particular to a robotic pipeline tool suitable for pushing or pulling other pipeline tools such as an autonomous isolation tool within a pipeline.

There is a frequent requirement to intervene in pipeline systems, risers, valves, or other pipeline appurtenances, in order to effect isolation activity. This is to enable, for example, repair of a pipe section or valve, to conduct a hydrostatic test against a new addition to a pipeline system or valve replacement, or alternatively to do remedial work. There could also be requirements to survey, to photograph, to review damage, to conduct Magnetic Flux Leakage, to Corroscan, to paint or to conduct any other pipeline intervention operation. Such operations require placement of a piece of specialist equipment at a precise location within a pipeline.

To date, the movement of tools into position within pipelines has been achieved using a fluid pigging medium selected from one or more of the following examples water, oil, condensate MEG (monoethylene glycol), air, nitrogen or the pipeline's own gas product.

Pigging of specialist equipment to location using pipeline gas is difficult, as the tool being pigged tends to intermittently stop and start depending on the tools pigging friction with the pipe wall, the weight of the tool and the differential pressure being used to propel the tool along the pipeline against the gas pressure already present in the pipe line. Precise positioning at the desired location can be difficult and often arbitrary. Current practice involves the use of techniques such as open throttling and flaring off of the down-stream pressure in order to spring the item to the desired location.

A particular problem associated with moving or pigging a tool to a desired location in a gas pipeline system using water is the possibility of water by-pass and consequently formation of hydrates. Hydrates can cause a blockage in a pipeline. Should hydrates form in a pipeline it is then necessary to insert a specialist piece of equipment or introduces a chemical agent into the pipeline to breakdown the blockage. Other problems include corrosion from the introduction of water which is detrimental to the overall integrity of the pipeline system, Other problems include backing strips at the field joint weld location in some pipelines, which makes pigging difficult.

Major gas pipeline transportation systems require regular planned double block and bleed isolation, in order to conduct servicing on the valve systems at their upstream or downstream terminals.

It is therefore an object of the present invention to provide a pipeline tool that will eliminate the requirement to introduce a pushing fluid and its associated hazards, and that this pipeline tool is suitable for use with other pipeline tools, in particular autonomous isolation tools that will overcome the problems associated with moving pipeline tools to a location within a pipeline.

Pipeline transportation systems worldwide, especially gas pipeline systems would benefit from having a pipeline tool that obviates or makes un-necessary the requirement to use fluid and eliminates the possibility of water ingress when conducting maintenance activities. Northwest European gas transportation pipeline systems include for example;

| Ref | Name | Length | Diameter |
| --- | --- | --- | --- |
| 1 | Bacton to Zeebrugge UK Interconnector | 233 km | 40 inch |
| 2 | Zeepipe Norway to Belgium | 814 km | 40 inch |
| 3 | Balzand Interconnector | 235 km | 36 inch |
| 4 | Europipe 1 Norway to Germany | 660 km | 40 inch |
| 5 | Europipe 2 Norway to Germany | 642 km | 42 inch |
| 6 | Norpipe | 440 km | 36 inch |
| 7 | Franpipe Norway to France | 840 km | 42 inch |
| 8 | Ormen Lange Norway to England | 1166 km | 44 inch |
| 9 | SNIP Scotland to Northern Ireland | 50 km | 24 inch |
| 10 | Eire Interconnector Scotland to Ireland | 190 km | 24 inch |
| 11 | Eire Interconnector 2 Scotland to Ireland | 194 km | 30 inch |
| 12 | Statpipe Norway to Germany | 882 km | 28/36 in |
| 13 | FLAGGS to UK | 448 km | 36 inch |
| 14 | Frigg St Fergus | 2 × 360 km | 2 × 32 in |
| 15 | LOGGS to Theddlethorp | 120 km | 36 inch |
| 16 | Miller to St Fergus | 242 km | 30 inch |
| 17 | SAGE to St Fergus | 325 km | 30 inch |
| 18 | SEAL to Bacton | 463 km | 34 inch |
| 19 | West Shetland to UK | 395 km | 20 inch |
| 20 | Fulmar to St Fergus | 229 km | 30 inch |

It is acknowledged that the term 'comprise' may, under varying jurisdictions be provided with either an exclusive or inclusive meaning. For the purpose of this specification, and unless otherwise noted explicitly, the term comprise shall have an inclusive meaning that it may be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent from the ensuing description which is given by way of example only.

According to a first aspect of the invention there is provided a pipeline tool comprising;
    a first part and a second part, the first and second parts being separable from each other;
    a hydraulic system comprising at least one hydraulic piston and means for operating the piston, the hydraulic system being operable to returnably separate the first and second part of the device; the hydraulic system having a plurality of pipeline engaging means positioned along an exterior surface of the device, the pipeline engaging means being operable by the hydraulic system to be engagable with the interior surface of the pipeline; and
    a control unit, the control unit being in communication with the hydraulic system to control the movement of the pipeline engaging means and the first and second parts such that the pipeline tool is moveable within a pipeline.

Accordingly, the present invention provides a pipeline tool as set out in the appended Claims 1 to 32.

The advantage of this tool is that it is self-propelled, thus it is moveable to an accurate location within a pipeline without the use of water, or a propelling medium thereby eliminating the requirement to introduce a pushing fluid and its associated hazards. In a further embodiment of the invention the pipeline tool is connectable to another pipeline tool for example, a pipeline isolation tool. Consequently the pipeline tool of the invention provides a means for moving or accurately locating another pipeline tool at a desired location within a pipeline.

The pipeline tool of the present invention is suitable for use in straight pipe. In use, a pipeline has a plurality of valves at the termination points of the pipeline in order to retain the contents of the pipeline. These valves require maintenance or replacing over time. When the valves are repaired or replaced one or more isolation plugs are installed into the main pipeline in an autonomous intervention process. The pipeline tool of the present invention is particularly suitable for use in the straight sections of pipe positioned at pipeline termination points especially the sections of pipe associated with autonomous intervention into main pipeline transportation systems.

The applicant has a further invention relating to a pipeline tool that is suitable for positioning of autonomous isolation tools or other equipment in pipeline locations where bends, branching Y's, Tees or risers have to be negotiated before the equipment reaches the desired location. This further invention is the subject of another International Patent Application.

In a further aspect of the invention, the control unit of the pipeline tool is provided as a control pod which contains at least one microprocessor. In a preferred embodiment of the invention there are at least two microprocessors. In a further aspect of the invention the microprocessors are programmed with an embedded software program. In this way the control unit is programmed to control the movement of the pipeline tool through a pipeline transportation system. Conveniently this enables the pipeline tool of the invention to move horizontally, up or down inclines, and to move a load vertically up or down a straight pipeline section.

In a further embodiment of the invention the control unit further comprises a communications module which enables the pipeline tool to utilize ELF communications. The advantage of this is that the control unit of the pipeline tool of the invention is completely autonomous.

In a further aspect of the invention the pipeline tool comprises a primary and a backup hydraulic system. Optionally the primary and backup hydraulic system are completely independent from each other. Conveniently, the hydraulic system comprises at least one hydraulic piston or ram coupled to a plurality of fluid pipes and hydraulic fluid which flows around the hydraulic circuit to effect movement of the pipeline tool.

In a further aspect of the invention each of the primary and backup hydraulic systems comprise a plurality of hydraulic pistons or rams, wherein at least one piston or ram is an axial piston or ram and at least one piston or ram is a longitudinal piston or ram. It is to be understood that the terms piston or ram are used interchangeably throughout the specification. Use of the term ram extends to include the term piston, Neither term should be construed as limiting, any other suitable mechanism known to a person skilled in the art which will achieve the purpose of a ram or piston could also be used. Conveniently the axial ram and longitudinal rams are arranged such that they are perpendicular to one another.

In a further aspect of the invention each hydraulic system comprises at least nine rams wherein at least eight rams are axial rams and at least one ram is a longitudinal ram.

Conveniently in one embodiment of the invention the longitudinal rams of each hydraulic system are arranged such that they are parallel to each other. Preferably in this embodiment of the invention the hydraulic ram of the backup hydraulic system remains recessed when not in use. The advantage of this is that it avoids interfering with the operation of the primary hydraulic system. In order to achieve this purpose, it is preferable for the piston or ram of the backup hydraulic system to be slightly shorter than the piston or ram of the primary hydraulic system.

In a further aspect of the invention each of the axial hydraulic rams are arranged such that standard opposing forces principles enable each of the hydraulic rams to engage with the internal surface of the pipeline wall such that the pipeline tool remains in position within the pipeline regardless of the inclination of the pipeline or whether or not the surface of the pipeline is coated.

In a further aspect of the invention each of the axial hydraulic rams are provided with a pipeline engaging means. In a preferred embodiment of the invention the pipeline engaging means is a coated compression pad. This provides the compression pad with a surface which is tactile which promotes adhesion to the internal pipe wall surface. In one embodiment of the invention the compression pad is a rubber coated compression pad. In a further embodiment of the invention the compression pad is a threaded compression pad. It is understood that any suitable coating which is known to a person skilled in the art can be used.

In the preferred embodiment of the invention the control system of the pipeline tool monitors the operation of the hydraulic system. Conveniently monitoring of the hydraulic system is achieved by using one or more various types of sensors such as pressure sensors and proximity sensors. In use the sensors monitor various pressure levels on the pipeline tool of the invention. For example, the pressure levels between the pipeline engaging means and the interior surface of the pipeline. A further example includes the pressure within the pipeline as detected by the first and second parts of the pipeline tool. It is to be understood that the examples given are not limiting and that a person skilled in the art can place sensors within the pipeline tool of the invention at any desired location.

Preferably each of the sensors is provided with transmitters and receivers to enable transmission and receipt of information to and from the central processing unit. Conveniently the central processing unit is programmed to detect whether or not the pressure levels detected by the sensors fall within predetermined parameters. In the event that the primary hydraulic unit fails, the central processing unit is able to switch to the backup hydraulic system.

In a further aspect of the invention the means for operating the hydraulic system of the pipeline tool comprises a pump for operating the rams and/or pistons, means for operating the pump, a plurality of fluid pipelines positioned between the pump and the hydraulic rams. The hydraulic system also comprises an accumulator positioned in parallel with the pump.

In a further aspect of the invention the hydraulic system of the pipeline tool is provided with one or more check valves and/or controllers which control the flow of hydraulic fluid around the hydraulic circuit to control the movement of the pipeline engaging means and the first and second parts such that the pipeline tool propels in a controlled manner, a pipeline isolation tool along the inside of a pipeline.

In a further aspect of the invention the valves of the hydraulic system are arranged in such a way to achieve a triple redundancy fail safe unset system.

In a further aspect of the invention the hydraulic system is an engine driven system.

In one embodiment of the invention the pipeline tool is fully retractable from within a pipeline.

In a further aspect of the invention the pipeline tool has a sleep mode which is operable when the propulsion means are not in use. Conveniently when the pipeline tool of the invention is in sleep mode, it is retractable and movable to a distant location within a pipeline using pigging means. In use, the pipeline tool of the invention is coupled to a further pipeline tool such as an isolation plug, the pipeline tool of the invention is launched down the pipeline in sleep mode, once the pipeline tool has been moved the required distance, the pipeline tool is activated thus exiting sleep mode, the pipeline tool is then remotely operable to position the load to a precise location within the pipeline. In a further embodiment of the invention the pipeline tool of the invention is fitted with pigging disks or coupled to a chaser pig. This ensure that the pipeline tool of the invention can be pigged back to the start point.

In a further aspect of the invention the pipeline tool is movable to a location by deploying the pipeline tool from a launcher barrel. Conveniently the pipeline tool can also be recovered into a launcher or receiver barrel. In practice the size of the launcher or receiver barrel is irrelevant as a cartridge insert can be used to modify the sizing to the appropriate or desired size for the pipeline tool of the invention In a further embodiment the pipeline tool of the invention is able to enter the pipeline at a launcher or receiver and travel along the pipeline system pulling or pushing a load such as a pipeline isolation tool. Conveniently the orientation of the pipeline or the direction of travel of the pipeline tool of the invention within the pipeline is irrelevant. For example, the pipe within which the pipeline tool of the invention will travel can be horizontal, vertical or angled pipe wherein it is understood that horizontal is parallel to the x-axis, vertical is at right angles to the x-axis and angled is at any angle between an horizontal and vertical orientation. Furthermore it is to be understood that the pipeline tool of the invention can climb or descend whilst carrying or supporting a load within a vertical or angled pipe.

The pipeline tool of the invention is able to position the load with extreme accuracy without the use of a fluid or an external propelling medium.

The pipeline tool of the invention is further provided with a coupling mechanism which enables the pipeline tool to connect to a pipeline isolation tool or other technical equipment. In one embodiment of the invention the coupling mechanism comprises a double articulating ball and socket joint, a flexing spring joint, or a double acting universal joint.

It is to be understood that the pipeline tool of the present invention is suitable to support any other internal pipeline tool required within the industry. An example of other tools include a magnetic flux leakage train, a camera tool, a radiography tool, a hydrate buster, a paint application tool, or as a pulling pipeline tool for introducing fibre optic cables into old pipelines, or as an extraction tool without requirement to pig or flood a pipeline. A further advantage of the present invention is that in use it eliminates the requirement to flood, to dewater and then to vacuum dry or recondition the pipeline.

According to a further aspect of the invention the pipeline tool is coupled to a wheeled isolation tool comprising;
   a housing having gripping and sealing members encircling the housing in communication with a hydraulic system;
   a control unit in communication with one or more sensors and an actuator positioned within the housing;
   the gripping and sealing members being movable between an unset position in which the gripping and sealing members are in an unexpanded configuration and a set position in which the gripping and sealing members are in an expanded configuration whereby the control unit operates an actuator to move an hydraulic piston within the hydraulic system such that the gripping and sealing members are moved between an unset position and a set position.

In a further embodiment of the invention the pipeline isolation tool comprises a mechanical isolation tool. Conveniently the mechanical isolation tool can be located at either end of the pipeline tool of the invention.

Conveniently the isolation tool and pipeline tool of the invention operate in an autonomous environment without either an umbilical or tether attached to the housing of the invention.

The invention will hereinafter be more particularly described with reference to the accompanying drawings which illustrate by way of example only, two embodiments of the pipeline tool of the invention.

Figure 1B:
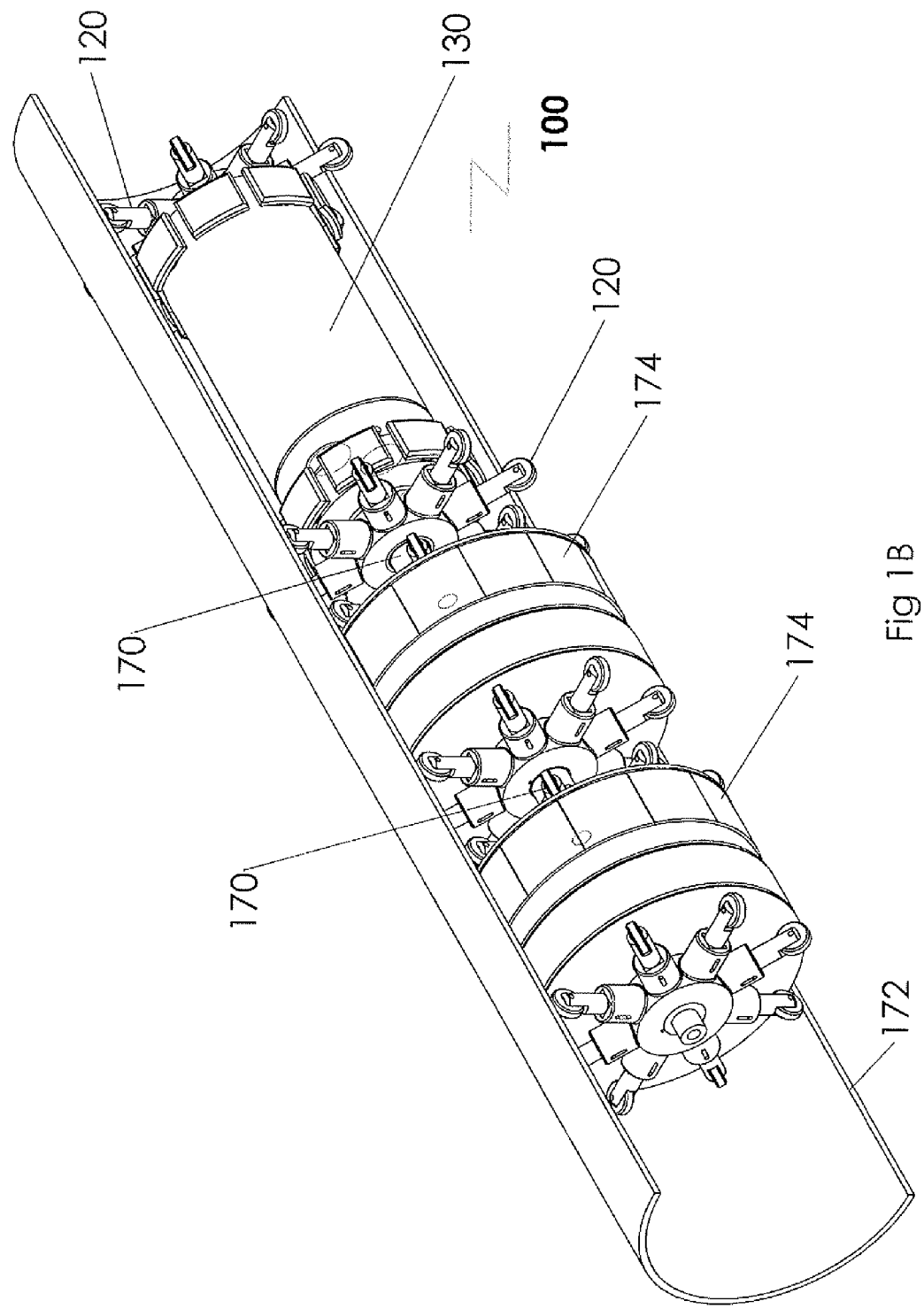
Figure 1C:
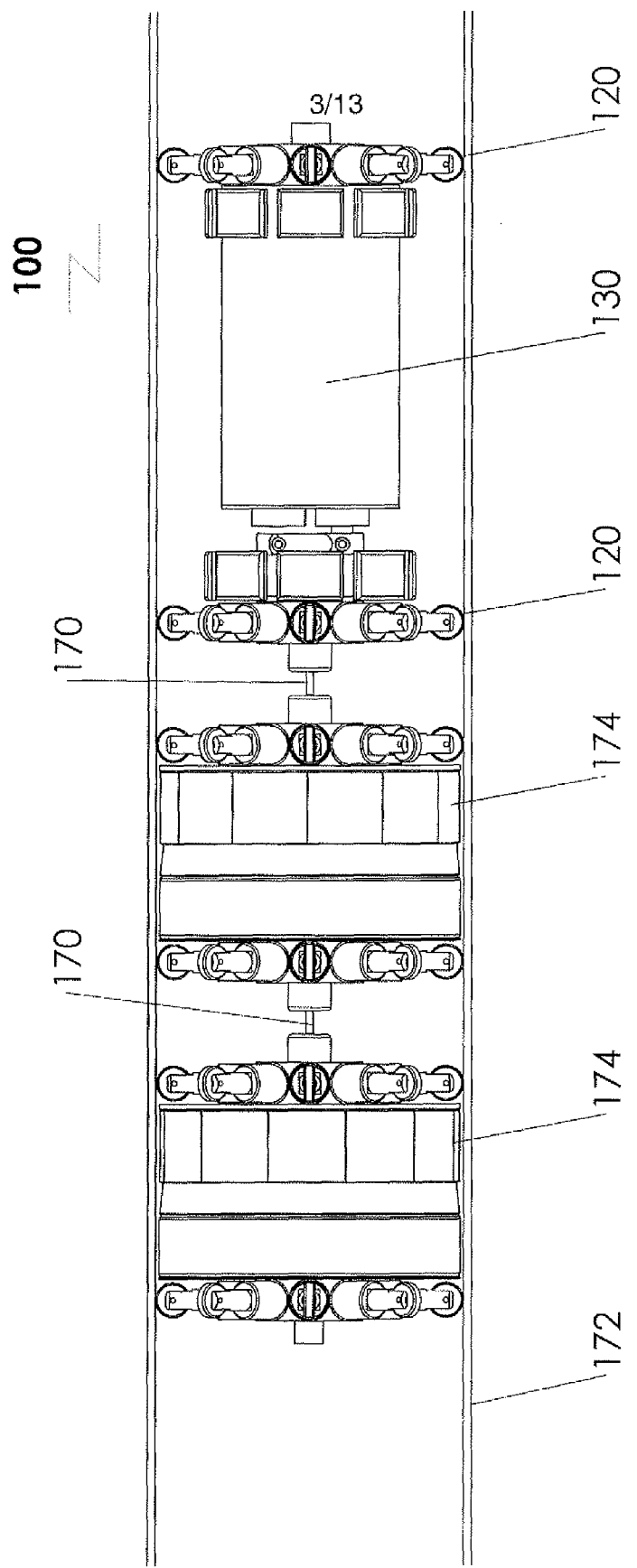
Figure 2G:
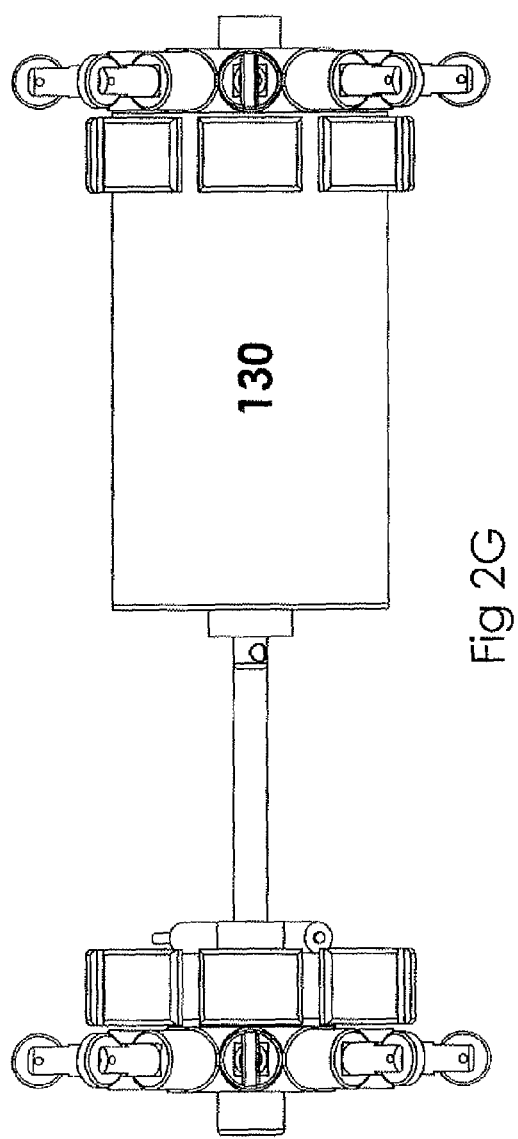
Figure 2H:
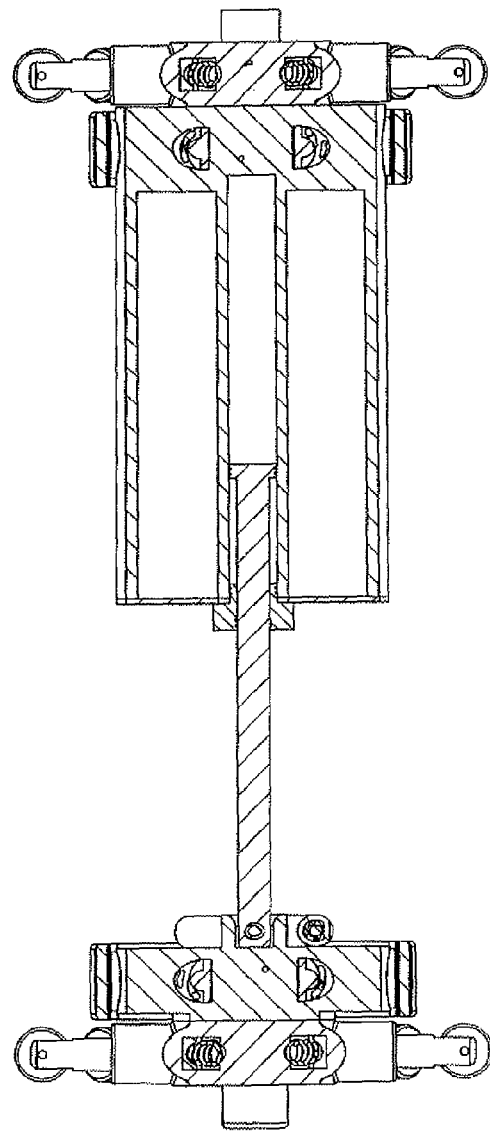
Figure 2F:
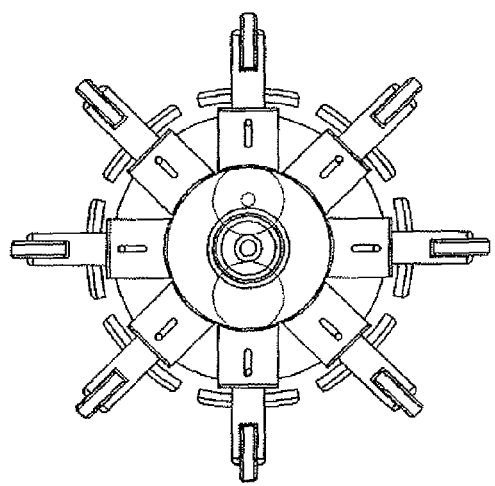
Figure 3:
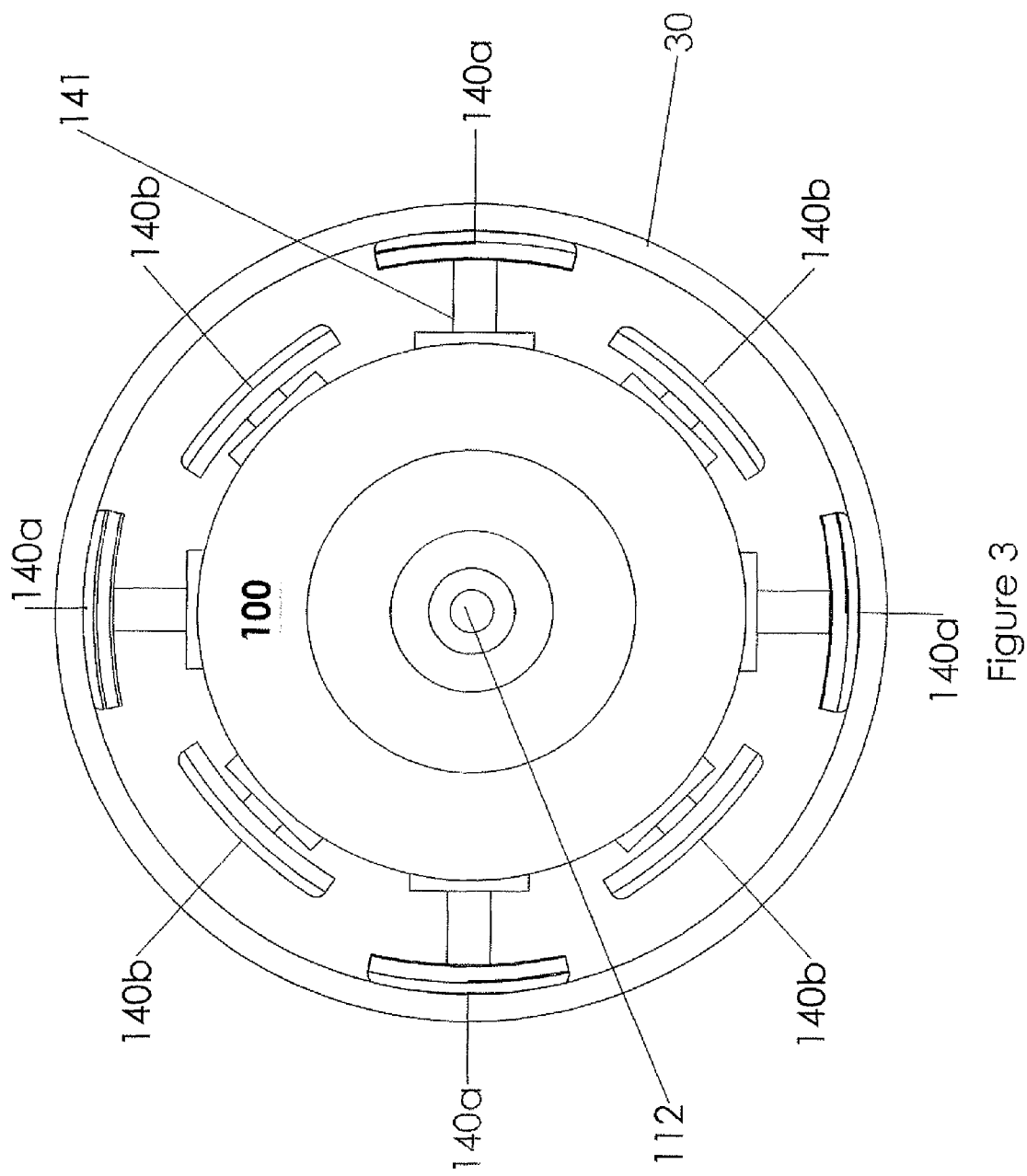
Figure 3A:
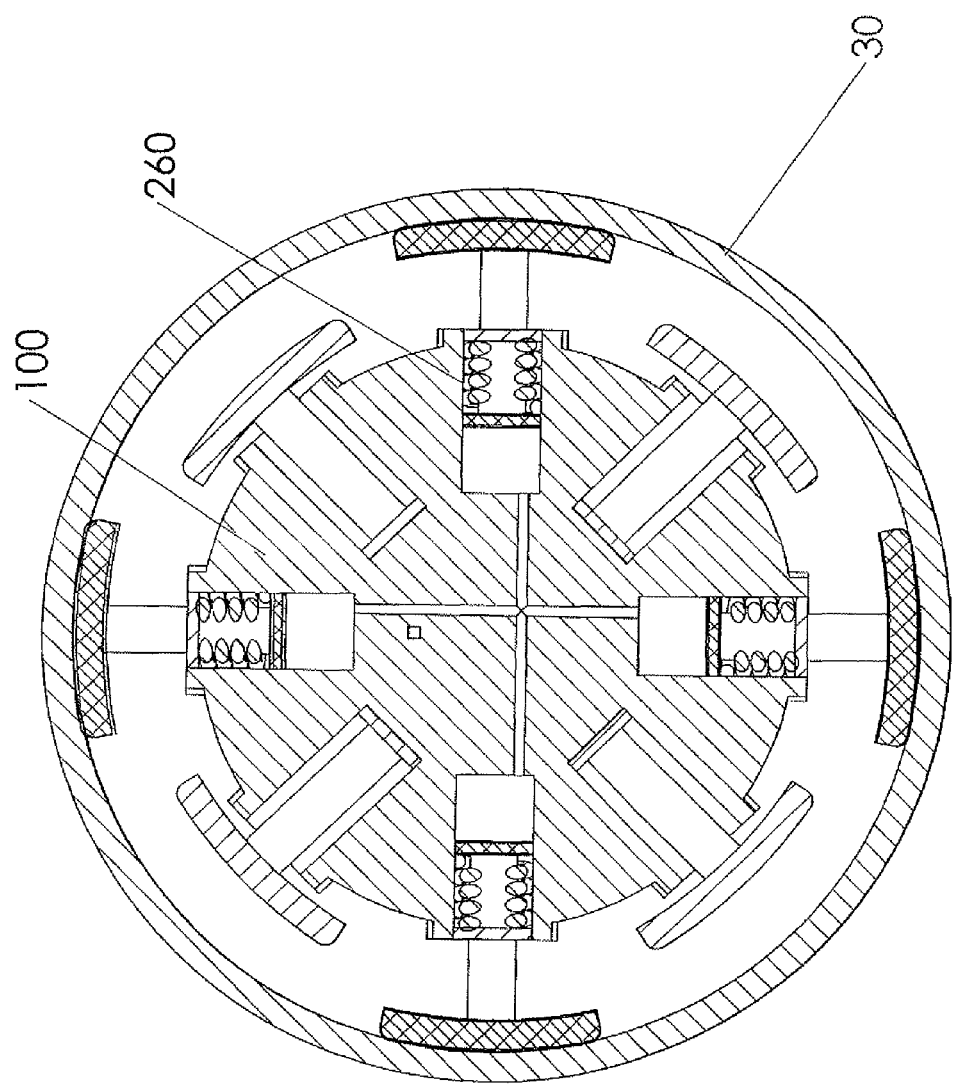
Figure 3B:
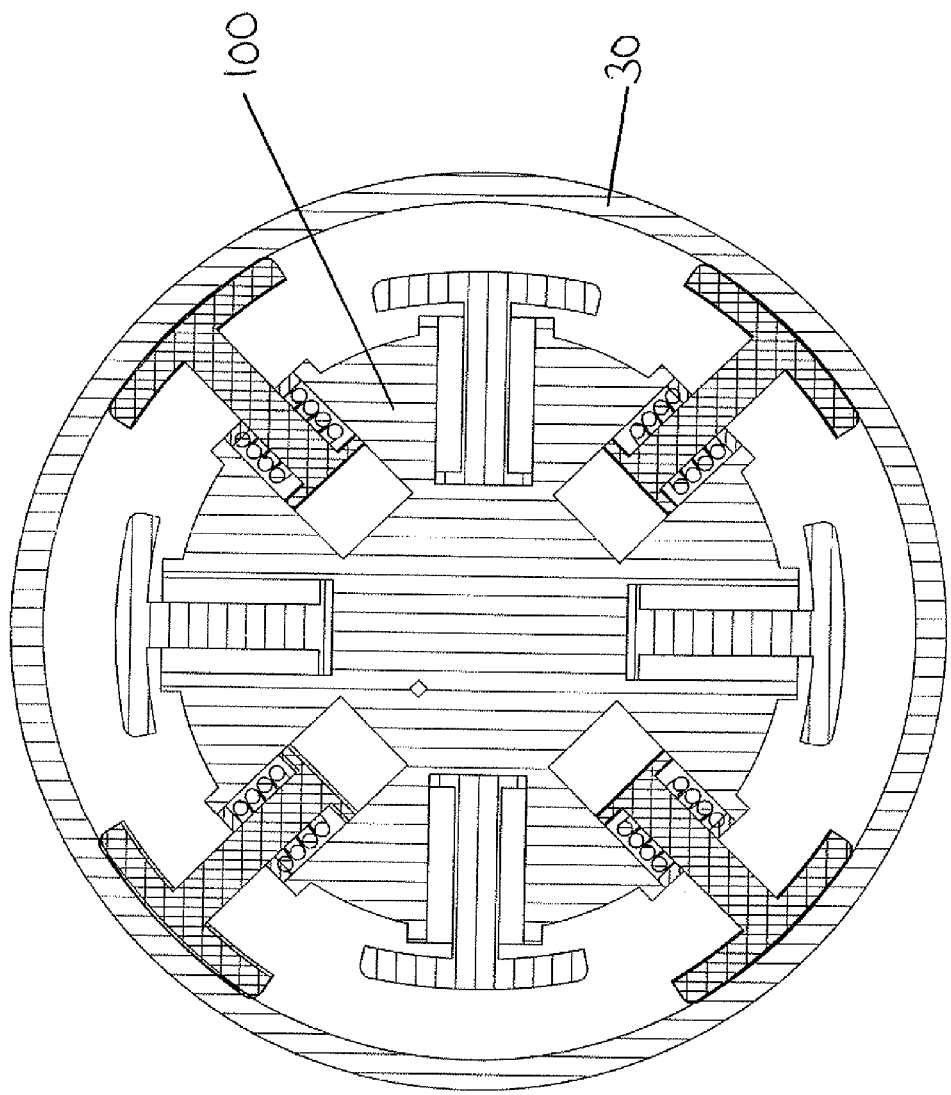
Figure 3C:
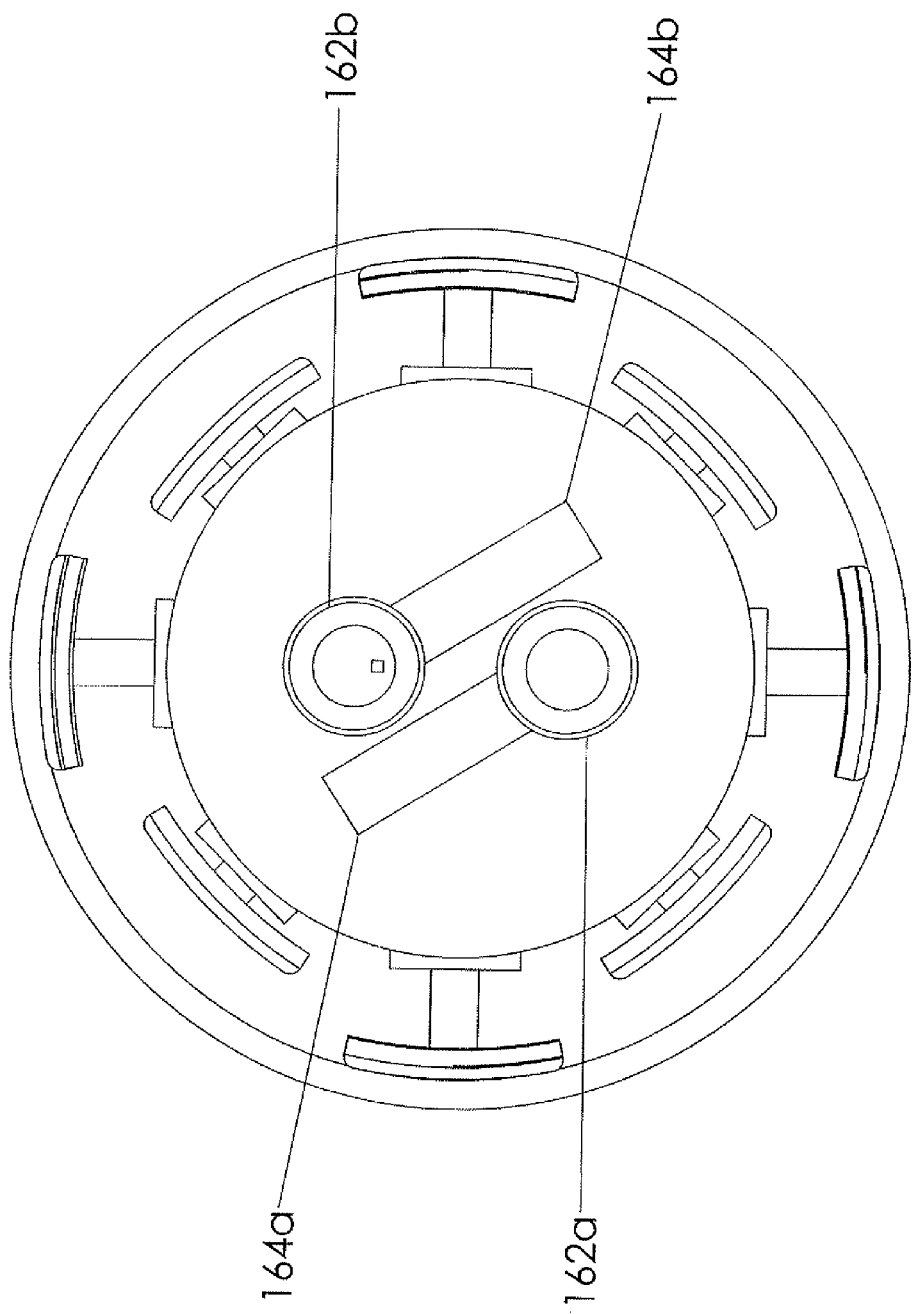
Figure 4:
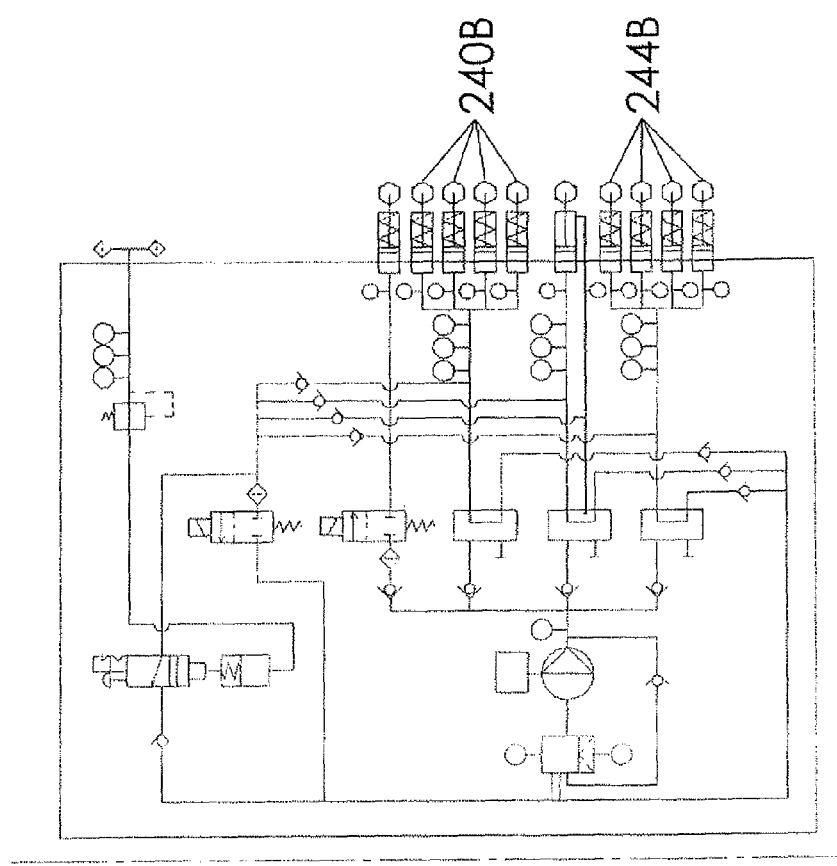
Figure 4:
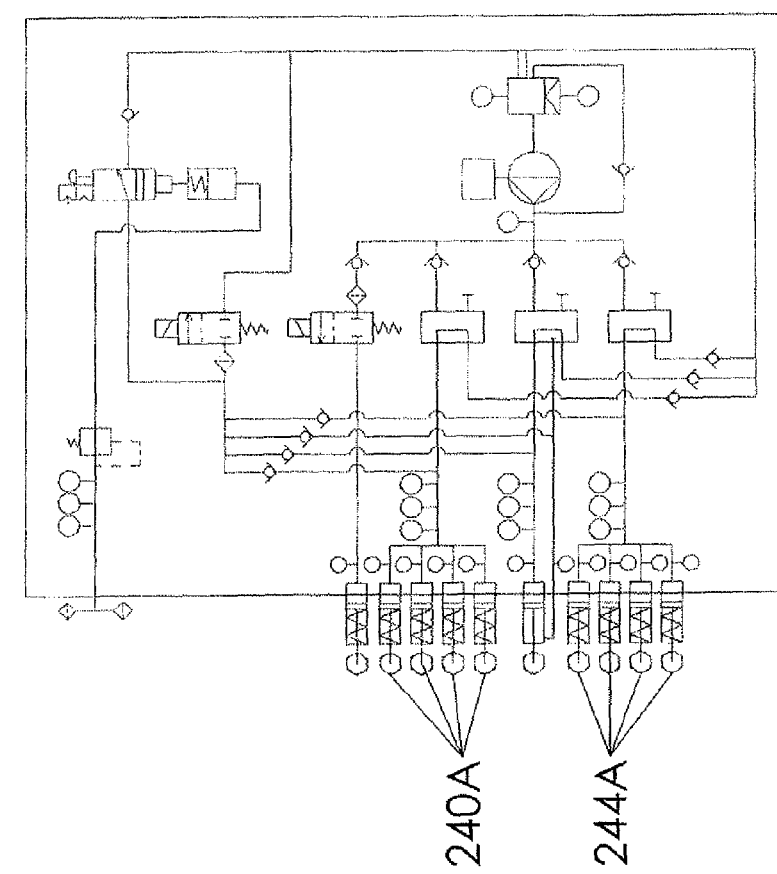
Figure 4A:
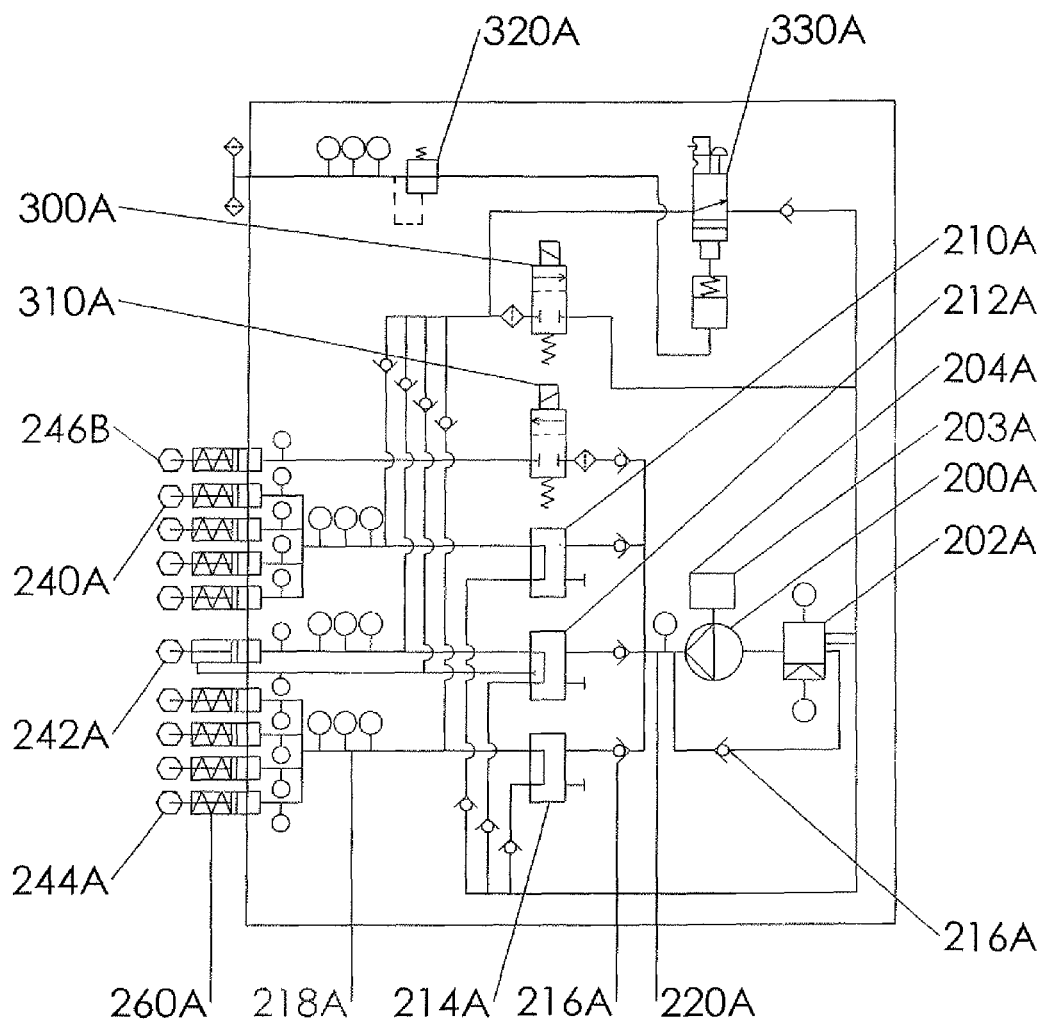
Figure 5:
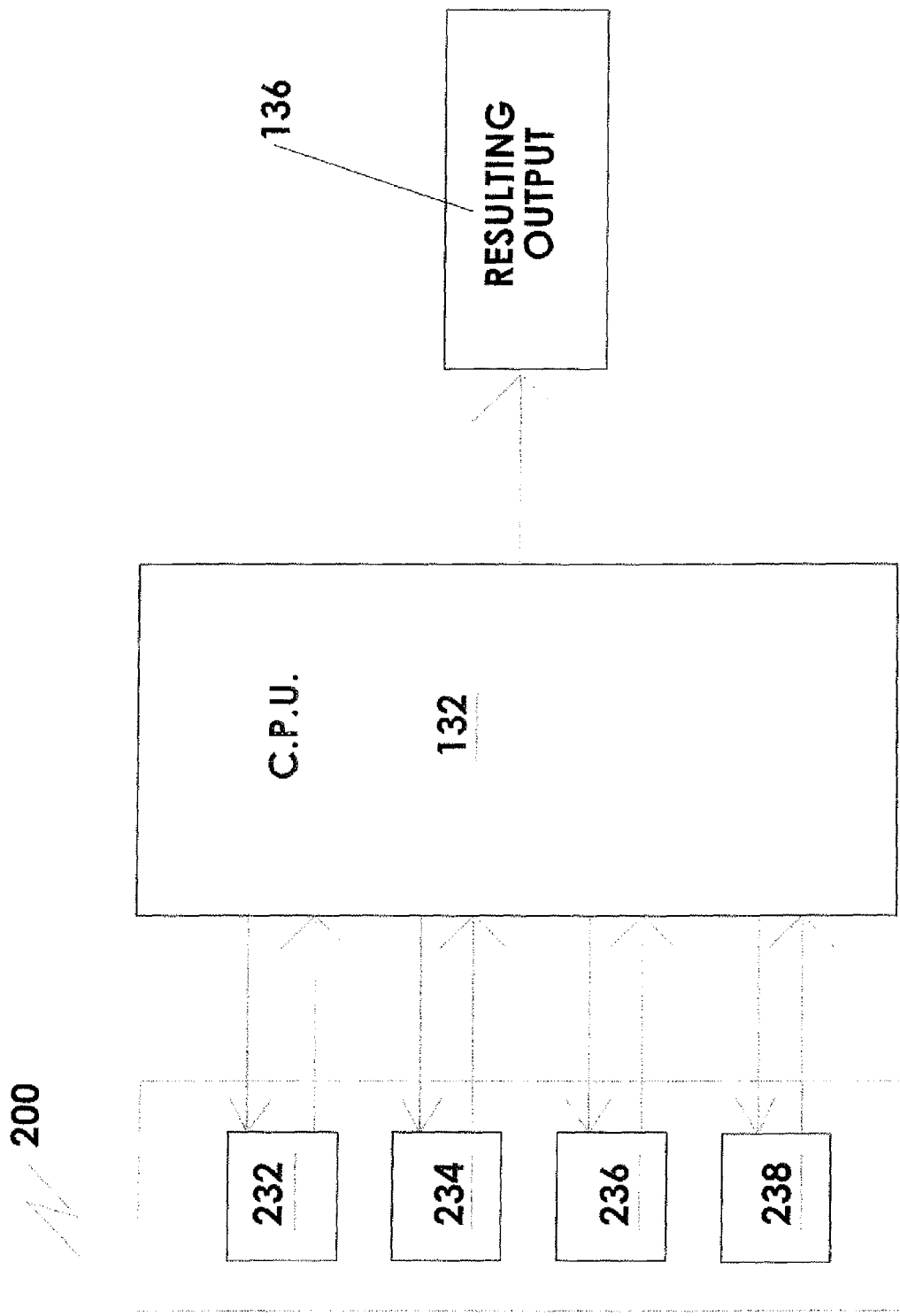

In the drawings;
   FIG. 1A is a perspective view of the pipeline tool of the invention;
   FIGS. 1B and 1C are perspective and side views of the pipeline tool coupled to two pipeline isolation tools within a cut away pipeline;
   FIG. 2 is a side view of the pipeline tool of the invention;
   FIG. 2A is an end view of the pipeline tool of FIG. 2;
   FIG. 2B is a side sectional view of the pipeline tool of FIG. 2;
   FIG. 2C is an end view of the pipeline tool of the invention;
   FIG. 2D is a side view of the pipeline tool of FIG. 2 with system A longitudinal piston in an extended state;
   FIG. 2E is a side sectional view of the pipeline tool of FIG. 2D
   FIG. 2F is a second end view of the pipeline tool of the FIG. 2 wherein the pipeline tool has been rotated through 90° relative to FIG. 2A;
   FIG. 2G is a side view of the pipeline tool of FIG. 2F with system A longitudinal piston in an extended state;
   FIG. 2H is a side sectional view of the pipeline tool of FIG. 2G;
   FIG. 3 is an end view of the pipeline tool of FIG. 1 within a pipeline showing the A set of pipeline engaging means engaging with the inner surface of the pipeline wall;
   FIG. 3A is a section through the axial ram system showing Axial A rams engaging the pipe wall;
   FIG. 3B is a section through the same axial ram system showing Axial B rams engaging the pipe wall;
   FIG. 3C is a section showing the latching receivers for longitudinal pistons and the spring receptacles for unlatching the receivers;
   FIG. 4 is a schematic diagram of the hydraulic circuits for System A and B of the pipeline tool of the invention;
   FIG. 4A is a schematic diagram of the hydraulic circuit of System A; and
   FIG. 5 is a flow diagram outlining the functionality of the Central Processing Unit of the pipeline tool of the invention.

Referring initially to FIGS. 1 to 3, there is shown a pipeline tool 100 of the invention.

Pipeline tool 100 comprises a control pod 130 which houses a pair of embedded microprocessors (not shown) and two hydraulic systems, hereinafter referred to as normal hydraulic system A and standby hydraulic system B. The components contained within the control pod 130 are housed in a one atmosphere (1 ata) pressurised housing. Pipeline 100 of the invention also comprises two longitudinal rams 160*a* and 160*b* together with a plurality of axial rams 140A, 140B, 150A and 150B. A plurality of wheels 120 are provided at opposing ends of the pipeline tool 100 in a circular arrangement. The spring loaded wheels 120 function to hold the pipeline tool 100 in the centre of the pipeline thereby preventing the body of the pipeline tool 100 which houses the control pod 130 from coming into contact with the surfaces of the internal wall of the pipeline as shown in FIGS. 1B and 1C.

The pipeline tool 100 is provided with coupling means 170 which enables the pipeline tool 100 of the invention to couple to other items such as a pig train. Pipeline tool 100 can push or pull its load in either direction within the pipeline 172. In the example shown, pipeline tool 100 is coupled to a double module isolating plug 174. The double module isolating plug 174 is also provided with a number of circular wheel arrangements 120 to assist in movement of the pig train through the pipeline 172. The provision of the wheel arrangements 120 ensures that the pig train moves easily whilst being pushed or pulled through the pipeline 172, particularly given that the overall diameter of the double module isolating plug 174 is larger than that of the pipeline tool 100 of the invention. Coupling means 170 is in the form of an articulating double ball joint arrangement, wherein a ball connection is coupled to the socket 170A of the pipeline tool 100 as shown in FIGS. 1B and 1C. The load coupled to the pipeline tool could also be, for example, any one of a single or triple module isolating plug, an intelligent pig, a gauge pig, a hydrate blaster or an internal paint coating tool or any other device. Although not shown, it is to be understood that the pipeline tool 100 is also provided with a coupling means 170 at the opposing end of the pipeline tool 100.

Either normal hydraulic system A or standby hydraulic system B is operated to move pipeline tool 100 through the pipeline 172. The main operational hydraulic system is normal hydraulic system A. In the event of failure of hydraulic system A, hydraulic system B becomes the main operational hydraulic system to effect movement of the pipeline tool 100. The pipeline tool 100 can achieve this functionality even when the pipeline is in a fully vertical orientation, regardless of whether or not the internal wall of the pipeline is coated with a material having flow enhancing properties.

The embedded microprocessors control the engine of the pipeline tool 100 which in turn drives the hydraulic ram systems A or B.

Normal hydraulic system A and standby hydraulic system B each comprise eight segmented axial rams which are configured to provide maximum grip against the pipeline wall. The axial rams of hydraulic system A are divided such that four axial rams 140a are located at the first end of the pipeline tool 100 and four axial rams 150a are located at the second end of the pipeline tool 100. The axial rams of hydraulic system B are also divided such that four axial rams 140b are located at the first end of the pipeline tool 100 and four axial rams 150b are located at the second of the pipeline tool 100. For the purposes of clarity the axial rams located at the first end of the pipeline tool are indicated collectively by reference numeral 140 and those at the second end of the pipeline tool are collectively indicated by reference numeral 150 (FIG. 6). In use, normal hydraulic system A drives the axial rams 140A and 150A and longitudinal ram 160A. Standby hydraulic system B drives the axial rams 140B and 150B and longitudinal ram 160B.

Referring to all of the figures and in particular, FIG. 5, The microprocessors are nominated to respective sides of the pipeline tool 100 whereby side A of the control pod 130 corresponds to the first microprocessor which is in communication with normal hydraulic system A and side B of the control pod 130 corresponds to the second microprocessor which is in communication with standby hydraulic system B. The microprocessor at side A of the control pod 130 has priority until point of failure of side A. Failure of side A is subject to a set of system self diagnostics whereby the central processing unit 132 of the system diagnoses the status of various sensors 232, 234, 236, 238 and determines whether or not side A is operating within predetermined parameters. In the event that side A is operating outside the predetermined parameters then side A fails and side B takes control. The central processing unit 132 is provided with a self diagnostic system for the pipeline tool 100. A set of parameters or boundaries are provided which enable the central processing unit to determine when it is necessary and appropriate to allow side B to take control as determined in the resulting output 136.

Each of hydraulic ram systems A and B are further provided with a longitudinal ram 160a and 160b respectively. Each longitudinal ram 160 is positioned perpendicular to the segmented axial rams 140 and 150 as shown in FIG. 2B.

The axial rams 140a of System A at the first and second ends of the pipeline tool 100 are arranged in a circular ring arrangement such that the angle between each consecutive axial ram of System A in the ring arrangement is approximately 90°. The axial rams 140b of System B are Interspaced between the axial rams 140a of System A such that the axial rams 140b of System B at the first and second ends of the pipeline tool 100 are also arranged in a circular ring arrangement whereby angle between each consecutive axial ram of System B in the ring arrangement is approximately 90°. Thus collectively the axial rams 140 and 150 of Systems A and B at the first and second ends of the pipeline tool 100 are arranged in the circular ring arrangement such that the angle between each consecutive axial ram in the ring arrangement is approximately 45°.

Each of the axial rams 140 and 150 are provided with rubber soled compression segment pads (Gekos) 142 positioned substantially perpendicularly to the axial rams 140 and 150 respectively (FIG. 3D). The gekos 142 follow the natural contour of the interior surface of the pipeline wall, such that the profile of each geko matches the interior curvature of the inner surface of the pipeline wall. The gekos 142 are each threaded to achieve the maximum grip possible.

Pipeline tool 100 moves upwards and downwards within a pipeline 30 as desired by means of the hydraulic systems A and B.

Referring specifically to FIGS. 3, 3A, 3B, 4 and 4A, each of the eight compression segment pads 142 at the extremity of axial rams 140a and 140b respectively are manipulated into the required position by separate hydraulically driven pistons 240 and 244 (FIG. 4). Both hydraulic circuits for primary hydraulic system A and backup hydraulic system B are shown in FIG. 4. In use, only the axial ram sets of System A or axial ram sets of System B at the first and second ends of the pipeline tool may function at any one time. For clarity the operation of primary hydraulic system A will be described with reference to FIG. 4A. It is to be understood that backup hydraulic system B operates in a similar manner. Once the pistons have travelled the desired/required distance as determined by the piston 240A, 244A the respective segment pads 140A and 150A engage and lock onto the pipe wall 172 by hydraulic compression means as appropriate. For example as shown in FIG. 3, the axial rams 140a of System A are locked onto the pipe wall 172 whilst the axial rams 140b of System B are in a retracted position. It is understood that the axial rams 150A and 150B of Systems A and B at the second end of the pipeline tool 100 behave in a similar manner.

The pressure exerted by the axial compression pads 142 on the inner surface of the pipeline wall 172 are carefully calculated, to ensure sufficient compression is exerted on the pipeline wall whilst ensuring that the pressure exerted stays within allowable pipe hoop stress values. Furthermore, when pipelines are internally painted with a flow enhancing finish, it makes it extremely difficult for anything to cling to the wall, nonetheless the compression pads 142 use standard opposing forces principles to overcome the problems associated with coated finishes.

The hydraulic ram systems A and B are configured to allow full redundancy for each ram system A and B and to allow either ram system A or B to drive the operation. Although not shown, each hydraulic engine of system A and system B also has separate pumps, gearboxes, motors, accumulators, system pressure vessels A and B, separate sensor system A and B for all hydraulic rams and pads, separate sensor systems A and B for orientation and attitude, separate command systems A and B, separate control systems A and B, separate sequencer systems A and B, separate battery systems A and B, separate power train systems A and B, full triple redundancy unset systems A and B, and separate ELF through pipe wall communications systems A and B.

Referring to FIG. 4A, each of the independent rams 140A and 150A within hydraulic system A plus the ninth longitudinal ram 160A and the hydraulic system B unlatch mechanism, are driven by hydraulic pump 200A. Accumulator 202A is a pressurised reservoir which feeds oil into hydraulic pump 200A. Hydraulic pump 200A is driven by a motor 203A and gearbox 204A. For ease of reference each grouping of four axial A rams 140A and 150A correspond to axial hydraulic circuits 240A and 244A respectively. The ninth longitudinal ram 160A is marked as hydraulic circuit 242A. Fluid line 220A from hydraulic pump 200A feeds into hydraulic pistons 240A, 242A, and 244A through check valves 216A, valve controllers 210A, 212A and 214A and pressure transmitters 218A respectively.

Each of the rams 140A and 140B on the hydraulic systems A and B are fitted with a return spring 260A as shown in FIG. 3A. The axial rams have a reciprocating linear movement which is controlled by the hydraulic circuit and spring 260A. Each axial hydraulic system 240A and 244A has a controller in the form of a lock out pressure valve 210A and 214A respectively. Such a pressure valve 210A and 214A, allows each axial ram 140A or 150A to move into an extended position whilst preventing the axial rams 140A or 150A from exerting too much pressure or imparting excessive hoop stress into the pipe wall.

In use, as the axial rams 140A and 150A are moved outwards by hydraulic rams 240A and 244A towards the inner surface of the pipeline wall, springs 260A are compressed. When hydraulic fluid is released by the controllers 210A and 214A, the compressed springs 260A recover their memory drawing the axial rams 140A and 150A away from the pipeline wall. The controllers 210A and 214A are indexed to a certain point which ensures that the axial compression rams 140A and 150A do not exert excessive pressure onto the pipe wall.

Both longitudinal ram systems 160A and 160B cannot operate simultaneously. The longitudinal rams 160A and 160B are fitted with spring loaded latching mechanisms. The energy to compress the spring to unlatch and release the longitudinal rams 160A and 160B in use, can only be initiated by hydraulic pressure. The hydraulic pressure to conduct this function on the B latching spring, comes from the primary hydraulic system A. The hydraulic pressure to conduct this function on the A latching spring comes from the B system. This ensures the secondary B longitudinal ram system is engaged and fully latched, before the A longitudinal ram system unlatching system is hydraulically activated, unlatched and released, thus allowing longitudinal ram 160A to be relocated in its receiver.

Valve 310A controls the operation of the spring loaded latching mechanism for 160B at 246B however 246B is physically located within the A side hydraulic system circuit.

Valve 310B (located within the B hydraulic system) controls the operation of the spring loaded latching mechanism for 160A at 246A, which is located within the B side hydraulic system circuit.

Each hydraulic circuit of the invention (side A and side B) is also provided with a triple redundancy fail safe unset system which ensures that the pipeline tool of the invention can be decoupled from engagement with the pipeline wall, and returned to the pipeline start point. The triple redundancy fail safe unset system comprises an independent primary, secondary, and tertiary unset system.

The primary unset system is a normal independent unset system which is operated using extremely low frequency (ELF) communications to move Valves 210A and 212A and 214A into an open position to unload the hydraulic fluid back to the accumulator 202A and thereby unlock the ram systems.

The secondary unset system comprises a hyberbaric or hydrostatic upset unset system whereby a pre-set integrated detenting pressure release valve 320A detects a hyperbaric spike. The pressure build up, when it reaches a certain value, causes a piston to move which drives a shuttle within the detenting valve 330A forward causing the integrated detenting valve to deflect and latch, thereby releasing the pressure and fluid from the circuit back to accumulator 202A.

The tertiary unset system comprises a timed decay unset system, whereby valve 300a is triggered to depressurize the circuit once a predetermined measure has been reached, for example a 10 day countdown.

Further redundancy can be added to System A and System B as required

The ninth ram 160A of primary hydraulic system A and 160B of backup hydraulic system B is longitudinal, and is located in the central line of the control pod, and is the motive force for driving the pipeline tool 100 up or down the pipeline. Ram 160A is referred to as 'middle' for the purposes of the sequencer process table below. The set of axial compression segment pads fitted to control pod 130 and known as 150 (meaning either system A or system B) are referred to as bottom for the purposes of the sequencer process table below.

The second set of axial compression segment pads 140 (meaning either system A or system B) are referred to as top for the purposes of the sequencer process table below. Control of movement of the pipeline tool 100 up or down the pipeline is managed by use of a sequencer process. An example of how the logic works is presented in the sequencer process table below. Movement of the pipeline tool 100 will now be described with reference to the Sequenser Process Table below;

Sequenser Process Table

| Step | Bottom | Middle | Top | Remarks |
|---|---|---|---|---|
| 1 | Extended Axial compression segment pads 150 are extended and engage with the inner surface of the pipeline wall. | Retracted Ninth ram 160 is retracted. | Extended Axial compression segment pads 140 are extended and engage with the inner surface of the pipeline wall. | No movement |

-continued

| Sequenser Process Table | | | | |
|---|---|---|---|---|
| Step | Bottom | Middle | Top | Remarks |
| CHECK CONDITION | | | | |
| 2 | Extended Axial compression segment pads 150 are extended and engage with the inner surface of the pipeline wall. | Retracted Ninth ram 160 is retracted | Retracting Axial compression segment pads 140 are disengaging with the inner surface of the pipeline wall. | Moving Retracting Top pads 140 move away from pipe wall. Pipeline tool is held on by bottom pads 150. |
| 3 | Extended Axial compression segment pads 150 remain extended and engaged with the inner surface of the pipeline wall. | Extending Ninth ram 160 is extending | Retracted Axial compression segment pads 140 remain retracted. | Moving Extending main cylinder to push rapid set isolation tool up pipe on ninth ram 160. Pipeline tool is locked on by bottom pads 150. |
| 4 | Extended Axial compression segment pads 150 remain extended and engage with the inner surface of the pipeline wall. | Extended Ninth ram 160 is extended. | Extending Axial compression segment pads 140 are extended and engage with the inner surface of the pipeline wall. | Moving Top pads 140 back onto pipe wall in new higher position. Pipeline tool is locked on with top 140 and bottom 150 pads |
| CHECK CONDITION | | | | |
| 5 | Retracting Axial compression segment pads 150 are disengaging with the inner surface of the pipeline wall. | Extended Ninth ram 160 is extended | Extended Axial compression segment pads 140 remain extended and engaged with the inner surface of the pipeline wall. | Moving Bottom pads 150 are lifted off pipe wall Pipeline tool is locked on by top pads 140 |
| 6 | Retracted Axial compression segment pads 150 remain retracted | Retracting Ninth ram 160 is retracting | Extended Axial compression segment pads 140 remain extended and engaged with the inner surface of the pipeline wall. | Moving Main longitudinal ram is used to pull pipeline tool up the pipeline to next step. Pipeline tool is locked on by top pads 140 |
| 7 | Extending Axial compression segment pads 150 are extended and engage with the inner surface of the pipeline wall. | Retracted Ninth ram 160 is retracted | Extended Axial compression segment pads 140 remain extended and engaged with the inner surface of the pipeline wall. | Moving Bottom pads 150 are extended back onto pipe wall at new higher position. Pipeline tool is locked on with top 140 and bottom 150 pads |
| CHECK CONDITION Back To Step 1 again | | | | |
| 1 | Extended Axial compression segment pads 150 are extended and engage with the inner surface of the pipeline wall. | Retracted Ninth ram 160 is retracted. | Extended Axial compression segment pads 140 are extended and engage with the inner surface of the pipeline wall. | No movement Pipeline tool is locked on all 9 hydraulic rams 140 and 150 and 160 Ready to start next full sequence |

During normal movement within a pipeline four degrees of freedom, up, down, left and right are used to leverage the axial rams against the pipeline wall 172 to grip the pipe wall. Once the pipeline tool 100 has gripped the pipeline wall 172, the longitudinal ram is extended which has the effect of moving the pipeline tool 100 up or down the pipeline thereby effecting movement of the pipeline tool 100.

Each of the axial rams at the first and second ends provides a gripping force whilst the longitudinal ram 160 pushes the propulsion tool 100 forward or backwards.

Although not shown an isotope can be mounted at some known radial point on the pipeline tool 100 to provide positioning information to external scintillating detectors.

Pipeline tool 100 can also be fitted with backup pigging disks, to enable it to be pigged out of the pipeline, by a propelled chaser pig if so desired.

In this embodiment of the invention the central processing unit 132 is further provided with a mechanism by which it can calculate the distance travelled from the number of longitudinal piston strokes of the axial hydraulic ram system A or B.

The pipeline tool 100 is made from suitable light-weight material which gives the tool high strength to weight ratios, examples of such light-weight material include titanium 6AI 4V or carbon fibre, however any suitable material known to a person skilled in the art can be used.

It will of course be understood that the invention is not limited to the specific details described herein which are given by way of example only and that various modifications and alterations are possible without departing from the scope of the invention.

The invention claimed is:

1. An autonomous pipeline tool for transit through a pipeline having an interior wall, the tool comprising:
    a device having a first part and a second part, the first and second parts being separable from each other;
    a hydraulic system comprising at least one hydraulic piston and means for monitoring the operation of the hydraulic system and operating the piston, the hydraulic system being operable to returnably separate the first and second parts of the device; the hydraulic system having a plurality of pipeline engaging means positioned along an exterior surface of the device, the plurality of pipeline engaging means being operable by the hydraulic system to be engagable with the interior surface of the pipeline, wherein each of the pipeline engaging means has a first position in which an increase of hydraulic pressure causes the engaging means to engage the interior wall and a second position in which a decrease of hydraulic pressure causes the engaging means to disengage the interior wall; and
    a control unit inside the device comprising a central processing unit, the control unit being in communication with the hydraulic system to control the movement of the plurality of pipeline engaging means and the first and second parts such that the autonomous pipeline tool is moveable within the pipeline
    wherein an umbilical or tether is not attached to the autonomous pipeline tool.

2. An autonomous pipeline tool as claimed in claim 1, wherein the hydraulic system comprises a plurality of hydraulic pistons or rams, wherein at least one piston or ram is an axial piston or ram and at least one piston or ram is a longitudinal piston or ram.

3. An autonomous pipeline tool as claimed in claim 2, wherein the axial rams and longitudinal ram are arranged such that they are perpendicular to one another.

4. An autonomous pipeline tool as claimed in claim 1, wherein each hydraulic system comprises at least nine rams wherein at least eight rams are axial rams and at least one ram is a longitudinal ram.

5. An autonomous pipeline tool as claimed in claim 1, wherein each of the axial hydraulic rams is provided with a pipeline engaging means.

6. An autonomous pipeline tool as claimed in claim 5, wherein each of the axial hydraulic rams are arranged such that standard opposing forces principles enable each of the pipeline engaging means to engage with the internal surface of the pipeline wall such that the autonomous pipeline tool remains in position within the pipeline.

7. An autonomous pipeline tool as claimed in claim 1, wherein the pipeline engaging means is a coated compression pad.

8. An autonomous pipeline tool as claimed in claim 7, wherein the coated compression pad is either a rubber coated compression pad or a threaded compression pad.

9. An autonomous pipeline tool as claimed in claim 1, wherein the autonomous pipeline tool further comprises a plurality of wheels.

10. An autonomous pipeline tool as claimed in claim 1, wherein the control unit of the autonomous pipeline tool is provided as a control pod, which comprises at least one microprocessor.

11. An autonomous pipeline tool as claimed in claim 1, wherein the control unit comprises at least two microprocessors.

12. An autonomous pipeline tool as claimed in claim 1, wherein the control unit is programmed with an embedded software program.

13. An autonomous pipeline tool as claimed in claim 1, wherein the control unit comprises a communications module.

14. An autonomous pipeline tool as claimed in claim 1, wherein the hydraulic system comprises at least one hydraulic piston or ram coupled to a plurality of fluid pipes and hydraulic fluid which flows around the hydraulic circuit to effect movement of the autonomous pipeline tool.

15. An autonomous pipeline tool as claimed in claim 1, wherein the hydraulic system comprises independently operable primary and backup hydraulic systems.

16. An autonomous pipeline tool as claimed in claim 15, wherein the longitudinal rams of each hydraulic system are arranged such that they are parallel to each other.

17. An autonomous pipeline tool as claimed in claim 15, wherein the hydraulic ram of the backup hydraulic system remains recessed when not in use.

18. An autonomous pipeline tool as claimed in claim 17, wherein the hydraulic ram of the backup hydraulic system is slightly shorter that the hydraulic ram of the primary hydraulic system.

19. An autonomous pipeline tool as claimed in claim 15, wherein the central processing unit is programmed to detect whether or not pressure levels detected by the means for monitoring the operation of the hydraulic system fall within predetermined parameters and whereby the central processing unit is able to switch to the backup hydraulic system in the event that the primary hydraulic unit fails and the pressure levels fall outside predetermined parameters programmed into the central processing unit.

20. An autonomous pipeline tool as claimed in claim 1, wherein the control system of the autonomous pipeline tool comprises means for monitoring the operation of the hydraulic system.

21. An autonomous pipeline tool as claimed in claim 1, wherein means for monitoring the operation of the hydraulic system comprises one or more various types of sensors such as pressure sensors.

22. An autonomous pipeline tool as claimed in claim 1, wherein the means for monitoring the operation of the hydraulic system are provided with transmitters and receivers to enable transmission and receipt of information to and from the central processing unit of the control system.

23. An autonomous pipeline tool as claimed in claim 1, wherein the means for operating the hydraulic system of the autonomous pipeline tool comprises a pump for operating the rams and/or pistons, means for operating the pump and a plurality of fluid pipelines positioned between the pump and the hydraulic rams.

24. An autonomous pipeline tool as claimed in any claim 23, wherein the hydraulic system comprises an accumulator positioned in parallel with the pump.

25. An autonomous pipeline tool as claimed in claim 1, wherein the hydraulic system of the autonomous pipeline tool is provided with one or more check valves and/or controllers which control the flow of hydraulic fluid around the hydraulic circuit to control the movement of the pipeline engaging means and the first and second parts of the autonomous pipeline tool such that the autonomous pipeline tool propels in a controlled manner, a pipeline isolation tool along the inside of a pipeline.

26. An autonomous pipeline tool as claimed in claim 25, wherein the check valves of the hydraulic system are arranged in such a way to achieve a triple redundancy fail safe unset system.

27. An autonomous pipeline tool as claimed in claim 1, wherein the autonomous pipeline tool comprises a sleep mode which is operable when the propulsion means are not in use.

28. An autonomous pipeline tool as claimed in claim 1, wherein the autonomous pipeline tool is movable to a location by deploying the autonomous pipeline tool from a launcher barrel.

29. An autonomous pipeline tool as claimed in claim 1, wherein the autonomous pipeline tool comprises a coupling mechanism for connecting one or more further pipeline tools or other technical equipment to the autonomous pipeline tool of the invention.

30. An autonomous pipeline tool as claimed in claim 29, wherein the coupling mechanism comprises one or more selected from the group comprising a double articulating ball and socket joint, a flexing spring joint, or a double acting universal joint.

31. An autonomous pipeline tool as claimed in claim 1, wherein the autonomous pipeline tool comprises a communications module which enables the autonomous pipeline tool to utilize ELF communications.

32. An autonomous pipeline tool as claimed in claim 1, wherein the autonomous pipeline tool is coupled to a wheeled isolation tool comprising;
 a housing having gripping and sealing members encircling the housing in communication with a hydraulic system;
 a control unit in communication with one or more sensors and an actuator positioned within the housing;
 the gripping and sealing members being movable between an unset position in which the gripping and sealing members are in an unexpanded configuration and a set position in which the gripping and sealing members are in an expanded configuration whereby the control unit operates an actuator to move an hydraulic piston within the hydraulic system such that the gripping and sealing members are moved between an unset position and a set position.

\* \* \* \* \*